Figure 6:
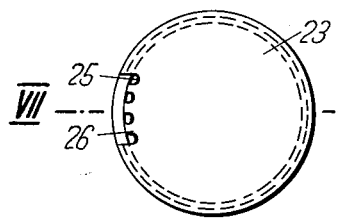

Dec. 8, 1964  A. W. HOWE  3,160,334
SALT SPRAYER
Filed Sept. 12, 1962  2 Sheets-Sheet 1
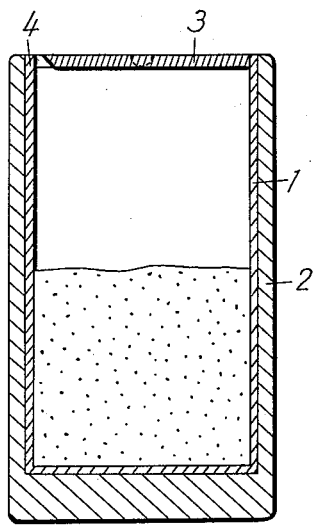
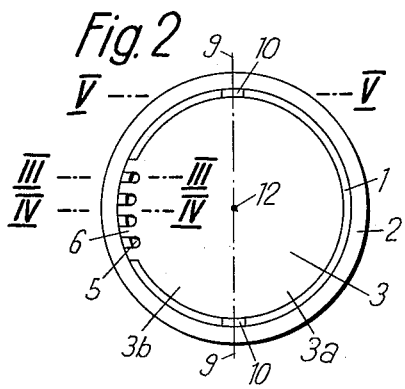
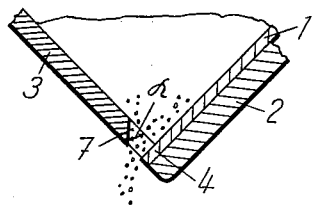
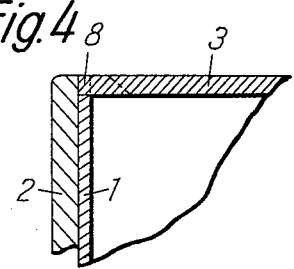
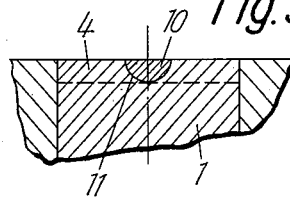

Dec. 8, 1964  A. W. HOWE  3,160,334
SALT SPRAYER

Filed Sept. 12, 1962  2 Sheets-Sheet 2

United States Patent Office 3,160,334
Patented Dec. 8, 1964

3,160,334
SALT SPRAYER
August Wilhelm Howe, Am Fort Gonsenheim 93,
Mainz (Rhine), Germany
Filed Sept. 12, 1962, Ser. No. 223,034
Claims priority, application Germany, Sept. 15, 1961,
H 43,647
9 Claims. (Cl. 222—556)

The invention relates to a sprayer for salt, spices and the like comprising a container and a lid with a spray opening, and will be described herein for convenience of description only in relation to a salt sprayer.

Known salt sprayers generally have apertures near the centre of the lid. Although the quantity of salt delivered may be controlled to some extent by the angle at which the sprayer is inclined and by shaking it more or less vigorously, this is inaccurate, particularly as the apertures easily become blocked.

In some known salt sprayers, the apertures are arranged in a row along one part of the edge of the lid but at some distance from the edge, and the apertures may be closed by a rotatable cap having suitable openings. These salt sprayers have the same disadvantages as those in which the apertures are distributed over the surface of the lid.

Finally, these are salt sprayers which have a flat sprayer sleeve more or less in the form of a spout containing a slot for spraying. In these sprayers, the container has a beaded extension at its inlet to this sleeve, to control the rate of delivery. It is very difficult to keep these sprayers clean, and incrustations easily form in the sleeve.

An object of the invention is to provide a sprayer with controlled delivery in which the spray openings will not clog and which can easily be cleaned and refilled.

In accordance with the invention, this is achieved by the fact that the parts of the boundary surfaces of the control apertures adjacent to the circumference of the lid form the direct rectilinear projection of the inner surface of the container. The invention provides a simple and reliable means of controlling the amount delivered from the sprayer by inclining downwardly that surface which contains the control apertures. Each time the container is lightly tapped, material is delivered from the container through the apertures, the quantity being determined by the inclination of the sprayer. It is therefore not necessary to shake the sprayer, and this simple arrangement has the additional advantage that the sprayer only needs to be held at an angle over the food, so that the steam from the hot food will not be absorbed into the container, where it would moisten the salt. This simple method of using a sprayer also makes it possible to deliver the contents exactly to the point where it is wanted, which is an advantage, for example for salting eggs. Thus the sprayer has two advantages, namely that the amount delivered can be controlled and the spot or area over which the contents are sprayed may also be accurately controlled.

In one embodiment of the invention, the boundary surface of the parts of the apertures near the centre of the lid expand and run obliquely towards the inside of the container, and the lateral parts of the boundary surfaces, near the edge of the lid, are perpendicular to the surface of the lid. This makes control of the amount delivered accurate, and also controls the maximum quantity that can be delivered by light tapping.

In another embodiment of the invention, the lid is inserted in the form of a flat rigid plate into the upper edge of the container, the apertures form grooves arranged like a comb in the outer edge of the lid, and those boundary surfaces of the apertures which face the circumference of the lid are formed by the walls of the container. In the arrangement according to the invention, the apertures no longer tend to get blocked or encrusted, but there is the additional advantage in this particular embodiment that the boundary surfaces of the apertures are arranged on two different easily separable parts, so that they are easily accessible.

To make the sprayer easy to open and close, the lid may be mounted in the top of the container in such a manner that it can be tilted about an axis parallel to the row of apertures, and the comb teeth arranged between the apertures may be prolonged beyond the outer edge of the lid and engage in grooves in the edge of the container, and the lid may be made of rigid and, if desired, transparent synthetic material, and the wall of the container may be made of flexible synthetic material. The wall of the container may be given the necessary strength or rigidity by means of a rigid outer decorative cover.

In this embodiment of the invention, the sprayer may be opened simply by pressing the lid down on the side opposite the apertures, thereby disengaging the teeth near the apertures. The sprayer may easily be placed in the position for use by pressing the lid down on the side containing the apertures until the teeth are fully engaged. This embodiment has the added advantage that no additional means are required for keeping the lid in position, since the teeth are quite sufficient to keep the lid closed. In addition, a beading may be provided on the wall of the container on the side opposite the apertures to prevent accidental opening of the lid.

Figure 8:
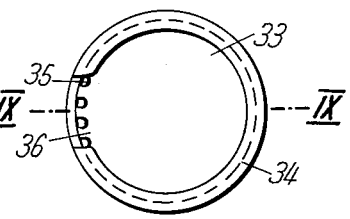
Figure 7:
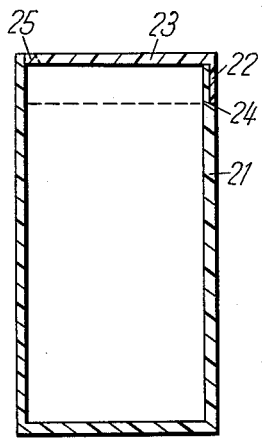
Figure 9:
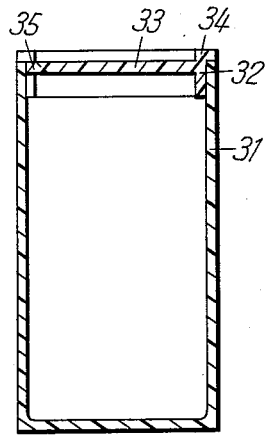
Figure 10:
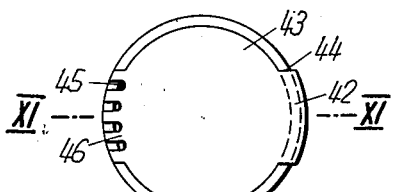
Figure 11:
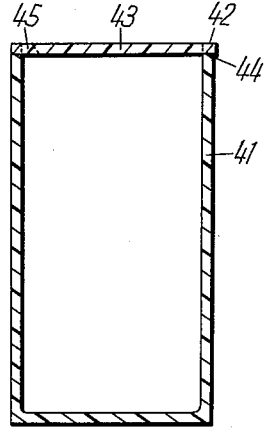

Several embodiments of the invention will now be described by way of example, with reference to the accompanying drawings, in which:

FIGURE 1 is a vertical section;
FIGURE 2 is a top plan of a sprayer according to FIGURE 1;
FIGURE 3 is a section on line III—III of FIGURE 2, with the sprayer inclined downwardly ready for use;
FIGURE 4 is a section on line IV—IV in FIGURE 2;
FIGURE 5 is a section on line V—V in FIGURE 2;
FIGURE 6 is a top plan of a second embodiment;
FIGURE 7 is a section on line VII—VII of FIGURE 6;
FIGURE 8 is a top plan of a third embodiment;
FIGURE 9 is a section on line IX—IX of FIGURE 8;
FIGURE 10 is a top plan of a fourth embodiment; and
FIGURE 11 is a section on line XI—XI of FIGURE 10.

In the embodiment shown in FIGURES 1 to 5, the sprayer is a salt sprayer. It comprises a cylindrical container 1 of flexible synthetic material, for example polyethylene. The cylindrical wall and the bottom of the container 1 are made in one piece, and the top of the container is left open. To reinforce the container 1 and for decorative purposes, it is covered by a cylindrical cover 2 which may be made of any stiff material, for example wood, metal, synthetic material or the like.

In the example shown in the drawing, the device is formed by the connection between the lid 3 and the upper edge 4 of the container 1. As shown in FIGURE 2, one side of the lid 3 has grooves 5 and teeth 6 arranged like a comb. Four grooves 5 and five teeth 6 are provided. The bottom 7 of the groove 5, which faces the centre of the lid, is inclined to the inside of the container at an angle of about 45° to 50°. The grooves 5 and the edge 4 of the wall of the container thereby form the apertures, which increase in width towards the inside of the container, as shown in FIGURE 3. The angle of inclination of the surface 7 may be greater or smaller than the range given above depending upon the substance for which the container is used.

As shown in FIGURES 2 and 4, grooves 8 are provided in the upper edge 4 of the wall of the container 1, in the region of the teeth 6, and the portions of the teeth 6 projecting from the edge of the lid can be pressed into these grooves. For attaching and removing the lid, the latter is mounted to be tilted about an axis 9—9 on the top edge 4 of the container 1. A pivot pin 10 of semi-circular cross-section is provided on each side of the lid 3 for this purpose. These pivot pins 10 fit into semi-circular grooves 11 in the top 4 of the wall of the container. The pivot pins 10 are so arranged in relation to the grooves 5 and the teeth 6 that the axis 9—9 is parallel to the row of apertures formed by the grooves 5, and the axis passes through the centre 12 of the lid.

The lid 3 is preferably made of transparent synthetic material, particularly organic glass, which is relatively firm but not brittle.

When in use, the salt sprayer, as shown in FIGURE 3, is inclined so that the lid 3 points downwardly, and the contents are delivered by lightly tapping on the cover 2 of the container 1 with one finger. Each time the cover 2 is tapped, a quantity of salt determined by the angle of inclination at which the salt sprayer is held is delivered from the four apertures. In the example illustrated, small quantities of salt are first delivered when the sprayer is held in a position in which the lid 3 is roughly perpendicular. When the inclination is increased, the quantity of salt delivered with each tap is increased to a maximum value which is obtained when the top 4 of the wall of the container 1 is at an angle corresponding approximately to the natural angle of inclination of the salt.

For refilling, the lid 3 is removed by pressing the half of the lid indicated by 3a in FIGURE 2 into the container 1. This disengages the teeth 6 from the groove 8 and the lid can then be removed completely from the top of the container 1. To close the lid, the pivot pins 10 are placed into their grooves 11 so that the teeth 6 lie above the grooves 8 and the curved surfaces of the pins 10 lie in the grooves 11. The half 3b of the lid is then pressed into position so that the teeth 6 fall into the grooves 8 and keep the lid 3 in position.

To prevent accidental removal of the lid, the wall 1 of the container may be provided at the top, at the side opposite the apertures, with a beading which fits over the top of the lid. If desired, one or more parallel walls may also be provided inside the sprayer, extending approximately parallel to the surface of the lid and occupying a part of the cross-section of the container.

In the embodiments shown in FIGURES 6 to 9, the sprayer may be made entirely of plastic without an ornamental or stiffening cover.

In the embodiment shown in FIGURES 6 and 7, the cylindrical container 21 is made of rigid synthetic material, and a recess 24 extends almost over the whole circumference of the top edge, and the lid 23, whose downwardly projecting border 22 also extends almost over the entire circumference fits into this recess. It is only in the region of the apertures 25 that the wall of the container 21 is of uniform thickness right up to the top edge, and the downwardly projecting edge 22 of the lid is absent.

In this embodiment, the apertures in the lid are provided by grooves 25 and teeth 26 arranged like a comb on the freely exposed peripheral edge of the lid in the region of the recess of the downwardly projecting edge 22 of the lid. The teeth 26 are only long enough to ensure that the teeth will bear against the inner surface of the wall of the container 21.

In the embodiment shown in FIGURES 8 and 9, the container 31 is of uniform wall thickness up to the top edge. The lid 33 has a downwardly projecting flange 32 which fits into the container, and a retaining ring 34 which fits on to the top edge of the container 31. The flange 32 and the ring 34 are recessed in the region of the apertures. In this example, the apertures are again formed by grooves 35 and teeth 36 arranged like a comb in the part of the periphery of the lid 33 which is freely exposed due to the recess in the flange 32 and in the ring 34. The teeth 36 are again long enough to bear against the inner surface of the wall of the container 31. The sprayer differs from that shown in FIGURES 6 and 7 in that the lid 33 can be placed on the container 31 at any position of rotation. To make it easier to insert and remove the lid 33, the ring 34 may be provided with a peripheral border.

In the embodiment shown in FIGURES 10 and 11, the container 41 may be made of rigid synthetic material and the lid 43 of relatively soft synthetic material. If desired, the lid 43 may be made of rigid material, as in FIGURES 1 to 5, and the container 41 of soft material, and the container may in that case be enclosed in a stiff cover.

In contrast to the lid shown in FIGURES 1 to 5, the lid 43 has a flange 42 for holding and supporting it, arranged on the side opposite the apertures and held, like the teeth 46, in a recess 44 in the upper edge of the container 41. To remove the lid 43, the flange 42, which projects outwardly beyond the wall of the container 41, is lifted from the recess 44, and the lid is removed by pulling the teeth 46 out of the recesses in the wall 41 in the region of the apertures.

The lid is inserted into the container by placing the projection 42 and the teeth 46 into their appropriate recesses in the wall 41 of the container.

Other constructional embodiments of the invention are possible in addition to the examples shown. For example, the salt container need not be cylindrical with a circular cross-section but may have any other shape or form. If the container is designed to be inserted in an ornamental or stiffening cover, it is advantageously conical with circular cross-section and tapering towards the bottom. If the container is rectangular or square in cross-section, the apertures are preferably arranged only on one side of the square or rectangle.

If desired, the container may be wider at the base than at the top, but the cross-section of the top of the container should be large enough for convenient refilling. At the top of the container, the inside of the wall should be substantially at right angles to the surface of the lid.

In the embodiments described, the lid is flat, but it may be curved upwardly or downwardly if desired.

I claim:

1. A dispenser, for spraying controlled amounts of salt, spices and the like, having dispensing apertures at its upper side arranged in at least one series along a lateral edge; said dispenser comprising a container being open at the upper end and having closed bottom and side walls, said side walls forming at least one uninterrupted inner surface of the container free of any inwardly projecting element; a container closure containing a flat lid arranged to close the top opening of said container, formed at its marginal portions with at least one series of notches extending through the entire thickness of the lid wall to form a series of teeth between said notches and to form said dispensing apertures the depth of which is determined by the wall thickness of the lid; said side walls of the container, at least adjacent to said notches of the lid, extending over said marginal edge and over said notches of the lid to a point even with the upper surface of the lid, the inner surface of the said side wall portion forming parts of the inner surface of the dispensing apertures; and positioning and securing means for said lid on said container providing a clamping engagement of lid portions with portions of the container side walls adjacent the upper edge of said side walls, and providing an uninterrupted flat inner surface of said side walls substantially free of inwardly projecting elements; said positioning and securing means being interrupted adjacent the dispensing apertures to form a free linear outlet in a direction axial with respect to said container and along said inner container surface portion extending to a point even with the upper surface of the lid.

2. Dispenser according to claim 1, wherein the side of the boundary surface of each dispensing aperture within the entire aperture depth facing the centre of the lid expands towards the inside of the container and is inclined obliquely to the inner surface of the container, the lateral parts facing the periphery of the lid being perpendicular to the surface of the lid.

3. Dispenser according to claim 1, wherein the lid is inserted in the form of a flat rigid plate into the upper edge of the wall of the container, the apertures being formed by grooves arranged in comb-like form in the outer edge of the lid, and the parts of their boundary surfaces facing the periphery of the lid being formed by the wall of the container itself in the peripheral region.

4. Dispenser according to claim 1 wherein the teeth formed by the said notches of the lid extend over the outer edge of the lid and frictionally engage in corresponding grooves provided in the top of the container side walls; the lid being of rigid synthetic material, and the container of flexible synthetic material.

5. Dispenser according to claim 4, wherein the wall is reinforced by an outer cover.

6. Dispenser according to claim 1, wherein the lid has a retaining flange which engages with the wall and which is recessed in the region of the apertures, the wall extending to the level of the upper surface of the lid in the region of the apertures, the apertures being formed by grooves and teeth arranged in comb-like form on the part of the lid where there is no retaining flange, and the teeth extending to the inner surface of the container.

7. Dispenser according to claim 1, wherein the lid has a holding and supporting projection on the side opposite the apertures, the teeth arranged between the apertures being prolonged over the outer edge of the lid and engaged in grooves arranged in the periphery of the wall, the projection being arranged to project over the outer surface of the wall and to fit into a recess in the periphery of the wall.

8. A closure for a container open at its upper end and having a closed bottom and side walls, said closure containing a flat container lid arranged to close the opening of said container and being formed at its marginal portions with at least one series of teeth extending over the outer edge of the lid for frictional engagement in corresponding grooves provided in the top of the container side walls; said lid having a pair of pivot pins diametrically arranged with respect to said lid, the pivot axis of said pivot pins being at a right angle with respect to the middle axis of said teeth; and bearing notches being arranged diametrically with respect to said container opening and having a semi-circular vertical cross-section open above, the common middle axis of said two bearing grooves being in the plane of the top rim of the container side walls and being arranged at a right angle with respect to the middle axis of said teeth receiving grooves of said container side walls.

9. Container closure according to claim 8, wherein a beading is provided on the container side wall on the side opposite the said teeth receiving grooves, to prevent accidental opening of the lid.

References Cited by the Examiner

UNITED STATES PATENTS

| 1,576,151 | 3/26 | Slick | 222—565 |
| 2,612,292 | 9/52 | Von Duyke | 222—142.4 |
| 2,626,084 | 1/53 | Wekerle | 222—565 X |
| 2,652,283 | 9/53 | Roop | 222—565 X |
| 2,734,663 | 2/56 | Lucas | 222—556 X |

FOREIGN PATENTS 619,257  5/61  Canada.

RAPHAEL M. LUPO, *Primary Examiner.*